Aug. 27, 1946.   C. A. ELLIS   2,406,596
EYE TESTING MEANS
Filed Dec. 24, 1943   2 Sheets-Sheet 1
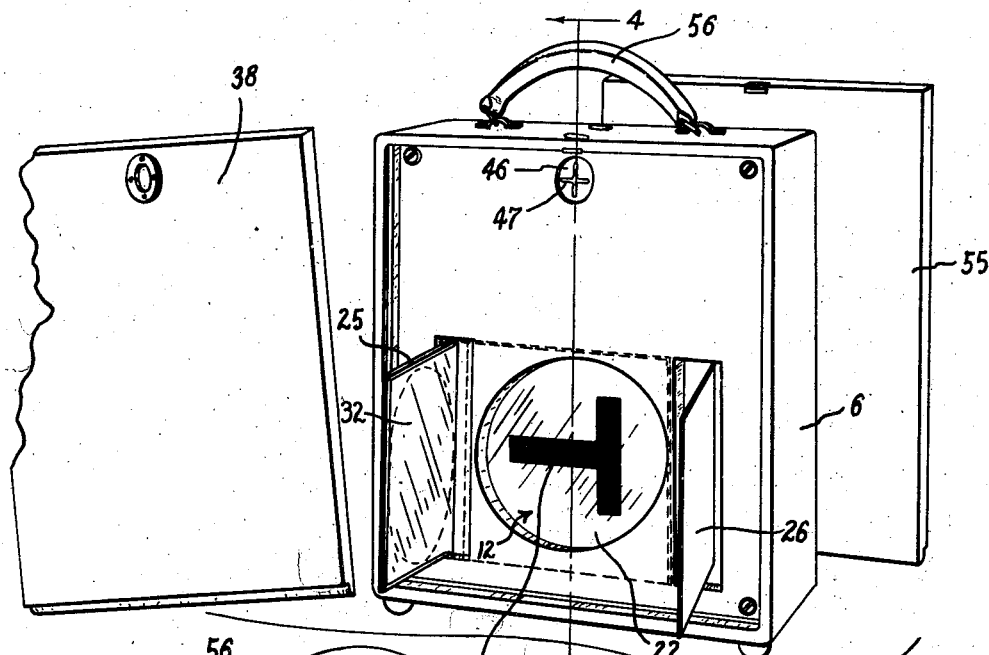
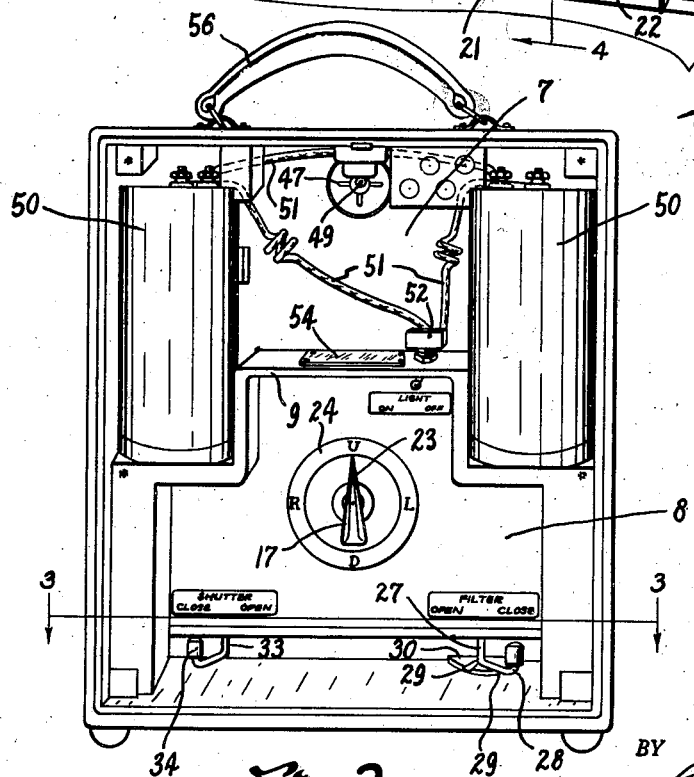
INVENTOR.
CHARLES A. ELLIS
BY
*Louis A. Gagnon*
ATTORNEY Aug. 27, 1946.  C. A. ELLIS  2,406,596
EYE TESTING MEANS
Filed Dec. 24, 1943  2 Sheets-Sheet 2

INVENTOR.
CHARLES A. ELLIS
BY
Louis K. Gagnon
ATTORNEY

Patented Aug. 27, 1946

2,406,596

UNITED STATES PATENT OFFICE 2,406,596

EYE TESTING MEANS

Charles A. Ellis, Southbridge, Mass., assignor to American Optical Company, Southbridge, Mass., a voluntary association of Massachusetts Application December 24, 1943, Serial No. 515,554

4 Claims. (Cl. 88—20)

This invention relates to test means for determining the visual efficiency of individuals and has particular reference to an improved device for performing such tests.

One of the principal objects of the invention is to provide an improved portable device for performing tests for determining the visual efficiency of individuals whereby the operable parts of the device may be manipulated outside of the direct field of vision of the individual under test.

Another object is to provide a device of the above character with test means having controlled form character in combination with mechanical means for manipulating said test means and for automatically controlling the position of movement of said means.

Another object is to provide a device of the above character embodying illuminated fixation means whereby the illumination for said fixation means serves to illuminate the working area or operable parts of the device.

Another object is to provide a simple, compact, and portable device of the above character.

Other objects and advantages of the invention will become apparent from the following description taken in connection with the accompanying drawings and it will be apparent that many changes may be made in the details of construction and arrangement of parts without departing from the spirit of the invention as expressed in the accompanying claims. I, therefore, do not wish to be limited to the exact details of construction and arrangement of parts shown and described as the preferred form only has been given by way of illustration.

Referring more particularly to the drawings:

Fig. 1 is a perspective view of the device embodying the invention showing the side cover means of said device removed;

Fig. 2 is a rear elevational view of the device illustrated in Fig. 1 with the rear cover removed;

Figures 3, 4, 5:
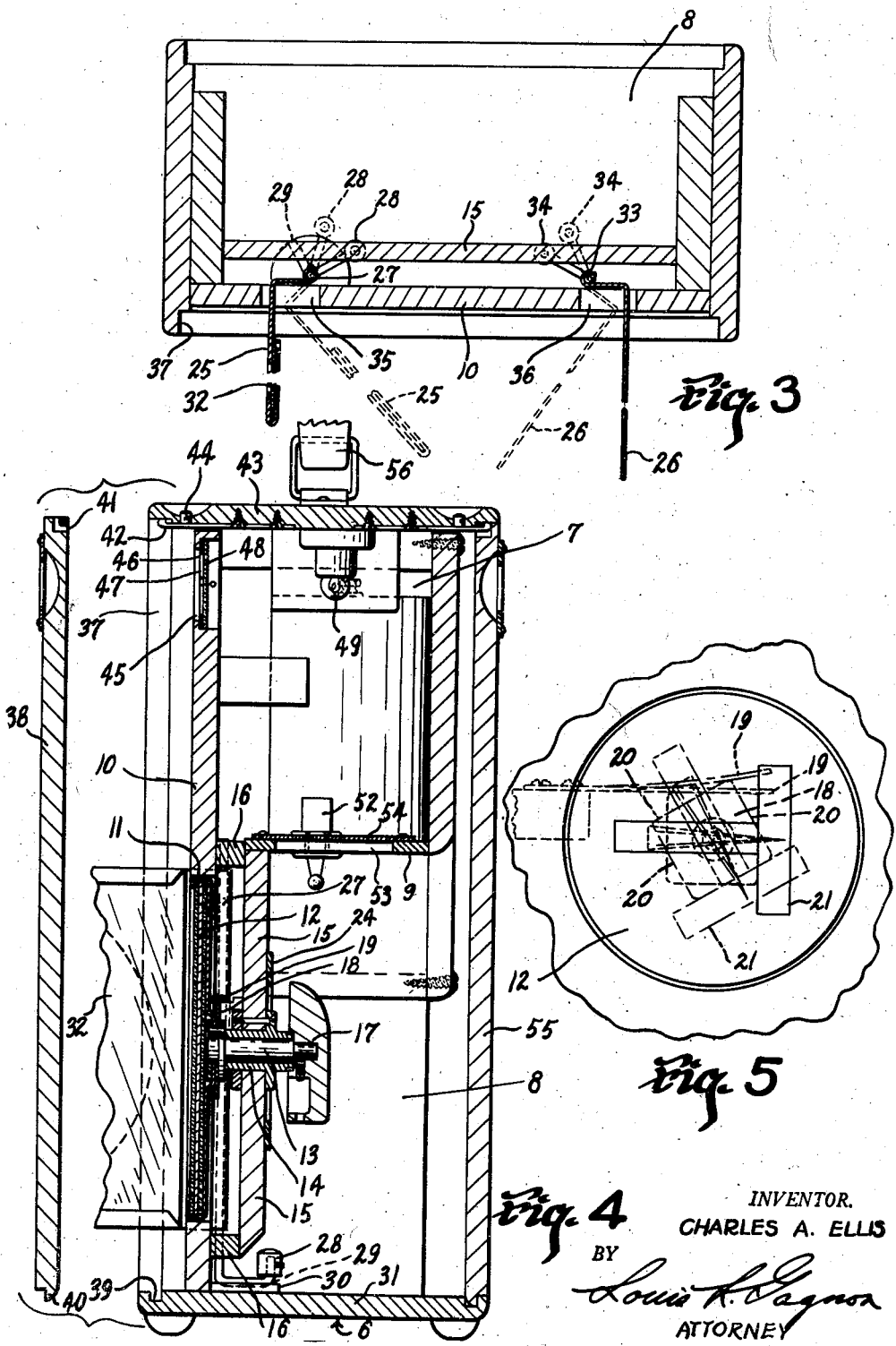
Fig. 3 is a sectional view taken as on line 3—3 of Fig. 2 and looking in the direction indicated by the arrows.
Fig. 4 is a sectional view taken as on line 4—4 of Fig. 1 and looking in the direction indicated by the arrows.
Fig. 5 is a fragmentary view illustrating the position control means for the test object.

Referring more particularly to the drawings wherein like characters of reference designate like parts throughout the several views, the device embodying the invention comprises a casing or housing 6 having spaced compartments 7 and 8 therein divided by a wall 9. The casing 6 is provided with a front wall portion 10 having an opening 11 in which is rotatably supported a disk member 12. The disk member 12 is carried by a pivot member 13 mounted in a bearing 14 carried by a supporting plate 15. The supporting plate 15 is secured to the front wall 10 by spacer blocks 16. The pivot member 13 is provided with a handgrip 17 by means of which the said disk 12 may be rotated. The pivot member 13, rearwardly of the disk 12, is provided with an indexing member 18 adapted to be engaged by a blade spring or the like 19. The indexing member 18, as shown in Fig. 5, is provided with flattened edges 20 which, when the handgrip member 17 is rotated an amount sufficient to move one of said flattened edges in the direction of the blade spring, the resilient pressure of the blade spring will tend to cause the adjacent flattened surface to assume an aligned relation with said blade spring thereby causing the disk to assume a given position of adjustment. The said indexing member 18, in the present instance, is provided with four flattened surfaces which determine four major positions of adjustment of the disk 12. The said disk 12, as shown in Fig. 1, is provided with a test character 21 which, in the present instance, is in the form of a letter T. The said letter T is preferably an opaque blank of the known Snelling proportion surrounded by a luminous surface 22 of fluorescent material whereby the T will be visible in the form of a silhouette. The fluorescent material referred to must be radium activated of a standard value in actual use. Before actual use, the luminous surface 22 is preferably held in complete darkness in order that the ordinary fluorescence due to light activation disappears and only the remaining fluorescence produced by radium activation remains.

It is to be understood that any desired form of test character may be used.

The handgrip member 17 is provided with an indicator 23 adapted to cooperate with a suitable dial 24 carried by the plate 15 by means of which the actual position of the test means may be determined by the operator.

On the opposed sides of the disk 12, there is provided two shutter members 25 and 26. The shutter member 25 is pivotally connected, as illustrated in Fig. 4, to a vertically disposed pivot rod 27 pivotally connected with the spacer blocks 16 and having an offset crank-like portion 28 on the lower end thereof. The crank-like portion 28, as shown in Figs. 2, 3 and 4, is adapted to engage indexing grooves 29 formed in a plate 30 carried by the base 31 of the casing 6. The indexing grooves 29 are so positioned in the plate 30 as to retain shutter 25 in two major positions of adjustment. The shutter 25 carries a transparent filter 32 which is of controlled density as to reduce the illumination of the fluorescent surface 22 to a given test standard.

It is to be understood that when the crank-like member 28 is operated in one direction, the shutter 25 may be swung outwardly to a position such as shown in Figs. 1 and 3 and when operated in the opposite direction said shutter member and more particularly the filter 32 carried thereby may be positioned to overlie the disk 12. This manipulation of the shutter 25 takes place in the rear of the device and outside of the field of vision of the individual under test.

The shutter 26, as shown in Figs. 1, 2, and 3, is pivotally supported at 33 by a pivot rod simulating the pivot rod 27 and is likewise provided with an offset crank portion 34. The shutter 26 is preferably in the form of an opaque shield movable to a position to overlie the shutter 25 and disk 12 or movable outwardly, as shown in Figs. 1 and 3, to expose said disk 12.

The said shutter members 25 and 26 extend through suitable openings 35 and 36 formed in the front wall 10, see Fig. 3. The front of the casing 6, as shown in Figs. 1 and 4, is provided with an inner shoulder 37 adapted to receive a removable cover member 38. The base of the casing 6, as shown at 39 in Fig. 4, is provided with a longitudinal slot adapted to receive a lip 40 formed on the lower edge of the cover 38 and the upper edge of the cover 38 is provided with a latch recess 41 adapted to latch with a suitable resilient latch member 42 carried by the upper wall 43 of the casing. The said resilient latch member 41 is provided with a finger engagement projection 44 by means of which it may be depressed so as to release it from the latch recess 41 when it is desired to remove the cover 38.

The wall 10, as shown in Figs. 1, 2, and 4, is provided with an opening 45 having a disk 46 supported therein. The disk 46 has a cross-like opening 47 therein for producing a cross-like image when light is projected therethrough. Directly in the rear of the disk 46, there is supported a transparent red filter 48 for producing a red colored cross-like image. This image is produced from light directed through the filter 48 and opening 47 from a suitable source of illumination 49 supported internally of the chamber 7. The source of illumination 49 obtains its electrical energy from suitable batteries 50 supported on the opposed sides of the chamber 7 and through the current flowing from said batteries through the circuit lines 51. The said circuit is connected with a suitable switch 52 by means of which the source of illumination 49 may be energized or de-energized.

The wall 9, as shown in Figs. 2 and 4, is provided with an opening 53 having a suitable transparent plate 54 thereover formed of glass or other transparent material. The opening 53 is adapted to allow light from the source of illumination 49 to traverse said wall 9 to illuminate the operable means internally of the compartment 8.

The housing 6 is provided with a detachable rear cover member 55 simulating the cover 38.

The upper wall 43, as shown in Figs. 1, 2, and 4, is provided with a handle 56 for ease of conveyance of the device.

The device set forth above is adapted particularly for use in determining whether or not night vision of an individual is normal.

The individual to be tested is first dark adapted either by having been placed in a totally dark room for a sufficient period of time or by wearing dark adaptation glasses or the like.

The individual is then seated at a predetermined distance in front of the test device, preferably five feet, with his eyes level with the center of the target or test character 21. The individual is first shown the test target or character by opening the shutter 26 to expose the test character and the different directions of movement of the test character is explained through rotation of the disk 12.

The shutter 26 is opened and closed several times while changing the direction of the test character to acquaint the patient with the technique. This preliminary step is carried out with the shutter 25 in open position.

The actual test is then performed by placing the filter 32 over the test character or disk 12 carrying said test character 21. This reduces the illumination of the field surrounding the test character to a given test standard which illumination is much below that of the initially exposed test character. The shutter 26 is then moved over the disk 12 and while in said position, the direction of the test character is moved to a given position through manipulation of the handgrip member 17. The arrow 23 functioning in cooperation with the dial 24 will indicate the actual position of the test character. It is to be noted, by reference to Fig. 2, that the letter U indicates that the T is in an upright position. L indicates that it is turned towards the left, R towards the right, and D in a downward position.

After having moved the test character to a given position, the shutter 26 through manipulation of the crank 34 is opened to expose the test character. This procedure is repeated several times and a record is kept of the reports of the patient and the test is determined by the accuracy of the patient's reports as to the position of the test character.

It is particularly pointed out that the shutter members 25 and 26 may be opened and closed as well as the disk 12 rotated by the individual performing the test without said adjustments being visible to the said individual under test, that is, the individual performing the test is in the rear of the device and the said shutters and disk may be manipulated outside of the field of vision of the individual under test. The illumination coming through the window 54 is sufficient to illuminate the parts being manipulated so that the examiner or individual performing the test accurately knows the position of adjustments of said shutters and disk member 12. The arrangement is such that the said shutter members and disk may be quickly and easily manipulated at will.

It is particularly pointed out, by reference to Fig. 5, that the accurate position of adjustment of the test character 21 is automatically established by the seating of the blade spring 19 with the adjacent flattened surface 20 of the indexing member 18. It is only necessary for the examiner to move the desired surface 20 in the direction of the spring whereby release of the handgrip 17 will permit the spring 19 to automatically complete the adjustment. The various positional adjustments may be quickly and easily obtained and in the present instance comprise four major positions. It is to be understood that if more major positions are required, more flattened surfaces would be provided on the indexing member 18.

The plate 46 having the cross-shaped opening therein provides a fixation point for the eyes of the individual during the test and is adapted to prevent complete relaxation of accommodation of the eyes of said individual. This arrangement overcomes the necessity of the eyes of the individual under test to reaccommodate between successive exposures of the test object 21. The fixation means resulting from the perforated disk 47 is preferably positioned in the focal plane of the test object and therefore affords accommodative means whereby the eyes of the individual under test are accommodated for that particular focal plane and the visibility of the test means may be more quickly and accurately attained.

From the foregoing description, it will be seen that simple, efficient, and economical means have been provided for accomplishing all of the objects and advantages of the invention.

Having described my invention, I claim:

1. An eye testing device comprising a cabinet having opposed side walls and a front wall with an opening therein, said cabinet being open in the rear thereof, a support in the rear of the front wall having a pivot bearing in substantially axial alignment with the opening in the front wall, a disc in said opening having a pivot pin rotatably mounted in said pivot bearing, said disc having a test object on the front face thereof to be viewed by an individual under test positioned in front of said cabinet, manually operable means secured to said pivot pin in the rear of the front wall and within the confines of the side walls of said cabinet which may be operated to rotate the disc from the rear of the cabinet, a pair of shutter members pivotally supported, one adjacent each of the opposed sides of the disc for movement toward and away from said disc, one of said shutter members embodying a transparent filter of controlled density being positionable in overlying relation with the test object independently of said other shutter member and said other shutter member being formed of opaque material and being positionable in overlying relation with the test object and in overlapping relation with the first shutter member when said first shutter member overlies the test object and manually operable means carried by said shutter pivots and lying in the rear of the front wall and within the confines of the side walls of said cabinet which may be selectively operated from the rear of the cabinet to position the shutter members in desired relation with the test object.

2. An eye testing device comprising a cabinet having opposed side walls and a front wall with an opening therein, said cabinet being opened in the rear thereof, a support in the rear of the front wall having a pivot bearing in substantially axial alignment with the opening in the front wall, a disc in said opening having a pivot pin rotatably mounted in said pivot bearing, said disc having a test object of fluorescent material on the front face thereof to be viewed by an individual under test positioned in front of said cabinet, manually operable means secured to said pivot pin in the rear of the front wall and within the confines of the side walls of said cabinet which may be operated to rotate the disc from the rear of the cabinet, a pair of shutter members pivotally supported, one adjacent each of the opposed sides of the disc for movement toward and away from said disc, one of said shutter members embodying a transparent filter of controlled density being positionable in overlying relation with the test object to reduce the intensity of the fluorescent material independently of said other shutter member and said other shutter member being formed of opaque material and being positionable in overlying relation with the test object and in overlapping relation with the first shutter member when said first shutter member overlies the test object and manually operable means carried by said shutter pivots and lying in the rear of the front wall and within the confines of the side walls of said cabinet which may be selectively operated from the rear of the cabinet to position the shutter members in desired relation with the test object.

3. An eye testing device comprising a cabinet having opposed side walls and a front wall with an opening therein, said cabinet being opened in the rear thereof, a support in the rear of the front wall having a pivot bearing in substantially axial alignment with the opening in the front wall, a disc in said opening having a pivot pin rotatably mounted in said pivot bearing, said disc having a test object on the front face thereof to be viewed by an individual under test positioned in front of said cabinet, manually operable means secured to said pivot pin in the rear of the front wall and within the confines of the side walls of said cabinet which may be operated to rotate the disc from the rear of the cabinet, a longitudinal opening on each of the opposed sides of the disc, a pair of shutter members pivotally attached to the support in the rear of the front wall, one on each side of the disc, and each extending through a respective longitudinal opening for movement toward and away from said disc, one of said shutter members embodying a transparent filter of controlled density being positionable in overlying relation with the test object independently of said other shutter member and said other shutter member being formed of opaque material and being positionable in overlying relation with the test object and in overlapping relation with the first shutter member when said shutter member overlies the test object and manually operable means carried by said shutter pivots and lying in the rear of the front wall and within the confines of the side walls of said cabinet which may be selectively operated from the rear of the cabinet to position the shutter members in desired relation with the test object.

4. An eye testing device comprising a cabinet having opposed side walls and a front wall with an opening therein, said cabinet being opened in the rear thereof, a support in the rear of the front wall having a pivot bearing in substantially axial alignment with the opening in the front wall, a disc in said opening having a pivot pin rotatably mounted in said pivot bearing, said disc having a test object on the front face thereof to be viewed by an individual under test positioned in front of said cabinet, manually operable means secured to said pivot pin in the rear of the front wall and within the confines of the side walls of said cabinet which may be operated to rotate the disc from the rear of the cabinet, means associated with said manually operable means for retaining said disc in given adjusted positions, a pair of shutter members pivotally supported, one adjacent each of the opposed sides of the disc for movement toward and away from said disc, one of said shutter members embodying a transparent filter of controlled density being positionable in overlying relation with the test object independently of said other shutter member and said other shutter member being formed of opaque material and being positionable in overlying relation with the test object and in overlapping relation with the first shutter member when said first shutter member overlies the test object, manually operable means carried by said shutter pivots and lying in the rear of the front wall and within the confines of the side walls of said cabinet which may be selectively operated from the rear of the cabinet and means associated with said latter manually operable means for retaining the shutter members in desired adjusted position relative with the test object.

CHARLES A. ELLIS.